US006760659B1

(12) United States Patent
Cowen

(10) Patent No.: US 6,760,659 B1
(45) Date of Patent: Jul. 6, 2004

(54) DEVICE AND METHOD FOR ENGINE CONTROL

(75) Inventor: Robert Andrew Cowen, Broadview Heights, OH (US)

(73) Assignee: Controls, Inc., Sharon Center, OH (US)

( * ) Notice: Subject to any disclaimer, the term of this patent is extended or adjusted under 35 U.S.C. 154(b) by 84 days.

(21) Appl. No.: 10/305,043

(22) Filed: Nov. 26, 2002

(51) Int. Cl.[7] .................................................. G05D 3/12

(52) U.S. Cl. ....................... 701/113; 701/115; 701/102; 700/287

(58) Field of Search ................................ 701/113, 115, 701/102, 29, 1, 54, 53, 101; 700/87, 170, 180, 287

(56) References Cited

U.S. PATENT DOCUMENTS

| | | | | |
|---|---|---|---|---|
| 4,368,705 A | | 1/1983 | Stevenson et al. | 123/357 |
| 5,377,112 A | | 12/1994 | Brown, Jr. et al. | 701/115 |
| 5,506,777 A | | 4/1996 | Skrbina et al. | 701/102 |
| 6,266,598 B1 | * | 7/2001 | Pillar et al. | 701/54 |
| 6,522,937 B2 | * | 2/2003 | Ette et al. | 700/87 |
| 6,587,767 B2 | * | 7/2003 | Letang et al. | 701/29 |
| 6,595,811 B2 | * | 7/2003 | Dagenais et al. | 440/1 |
| 2002/0046742 A1 | | 4/2002 | Hagri | 123/568.22 |
| 2004/0010349 A1 | * | 1/2004 | Perez et al. | 700/287 |

* cited by examiner

*Primary Examiner*—Hieu T. Vo
(74) *Attorney, Agent, or Firm*—Harpman & Harpman

(57) ABSTRACT

A microprocessor based interengageable engine generator set control device that provides bi-directional communication and control via a common J1939 protocol of electronic engine control units. Such engine control units provide critical engine information and control using manufacturers proprietary codes that are readable by the interface engine controller. Engine commands are issued by programmable software and operational input in response to information received and analyzed thereby.

8 Claims, 2 Drawing Sheets

DEVICE AND METHOD FOR ENGINE CONTROL

BACKGROUND OF THE INVENTION

1. Technical Field

This invention relates to electronic engine control devices that are used on a wide variety of industrial engines, specifically power generators that require engine and generator performance parameters to be monitored and provide required operational power output in relation to the effective load.

2. Description of Prior Art

Prior art energy control devices have been directed towards independent engine controls utilizing a number of independent remote sensors in a master slave orientation. See for example U.S. Pat. Nos. 4,368,705, 5,377,112, 5,506,777 and U.S. Patent Publication 2002/0040742 A1.

In U.S. Pat. No. 4,368,705 an engine control system is disclosed in which an electronic system controls engine performance parameters based on timing maps that define different modes of diesel engine operation.

U.S. Pat. No. 5,377,112 illustrates a method for diagnosing an engine using computer based models in which current engine operation parameters are determined and compared with a preset optimum operational settings and adjusted to match the preprogrammed requirements.

U.S. Pat. No. 5,506,777 describes an electronic engine control having a central processing unit and an analog to digital converter that receives analog engine performance data and converts same into digital output for processing by a central CPU device.

In U.S. Patent Publication 2002/0046742 A1 discloses an electronic control device for engines and method of controlling by comparing actual performance data with desired outcome by controlling the EGR valve in view thereof.

SUMMARY OF THE INVENTION

An electronic engine controller utilizing a controller network interface for direct bi-directional communication between electronic engine control unit (ECU) and the electronic engine controller utilizing the cam bus J1939 protocol to monitor and control the engine directly. The electronic engine controller uses programmable software to determine operational parameters and institute electronic control commands to the ECU in a pre-determined response operational framework.

DESCRIPTION OF THE PREFERRED EMBODIMENT

Figure 1:
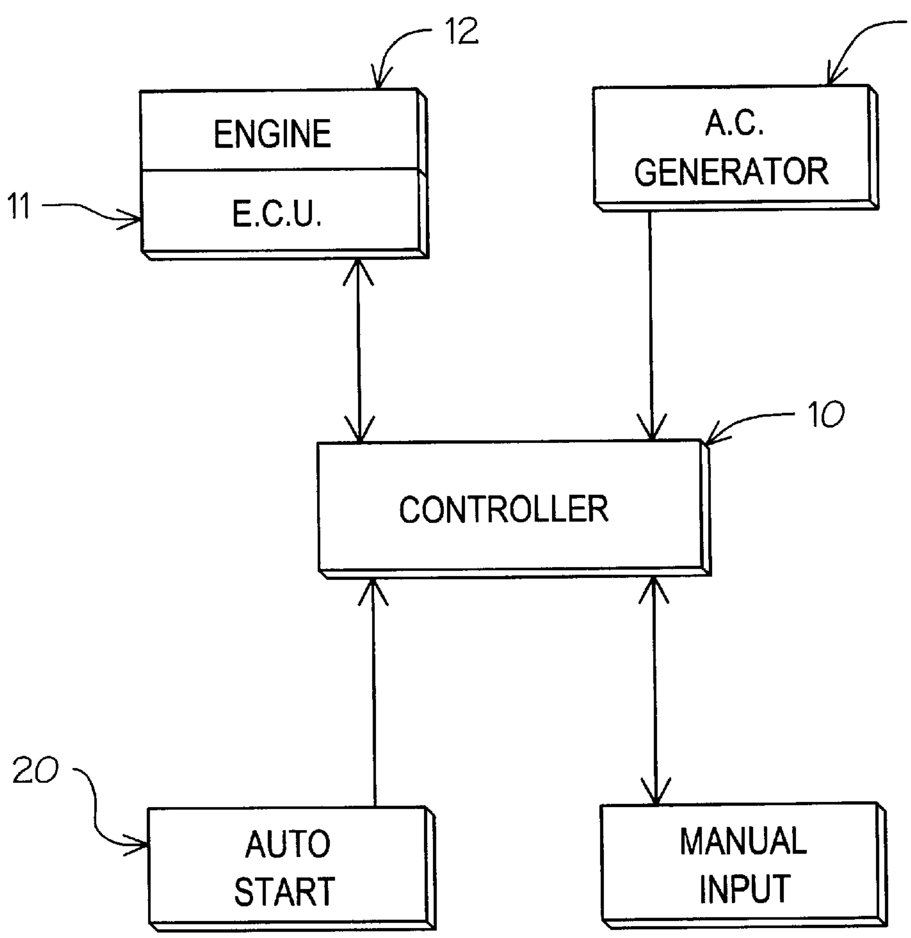
FIG. 1 is a graphic block flow diagram of the basic controller interface and relation of same with operational aspects to be controlled.
Figure 2:
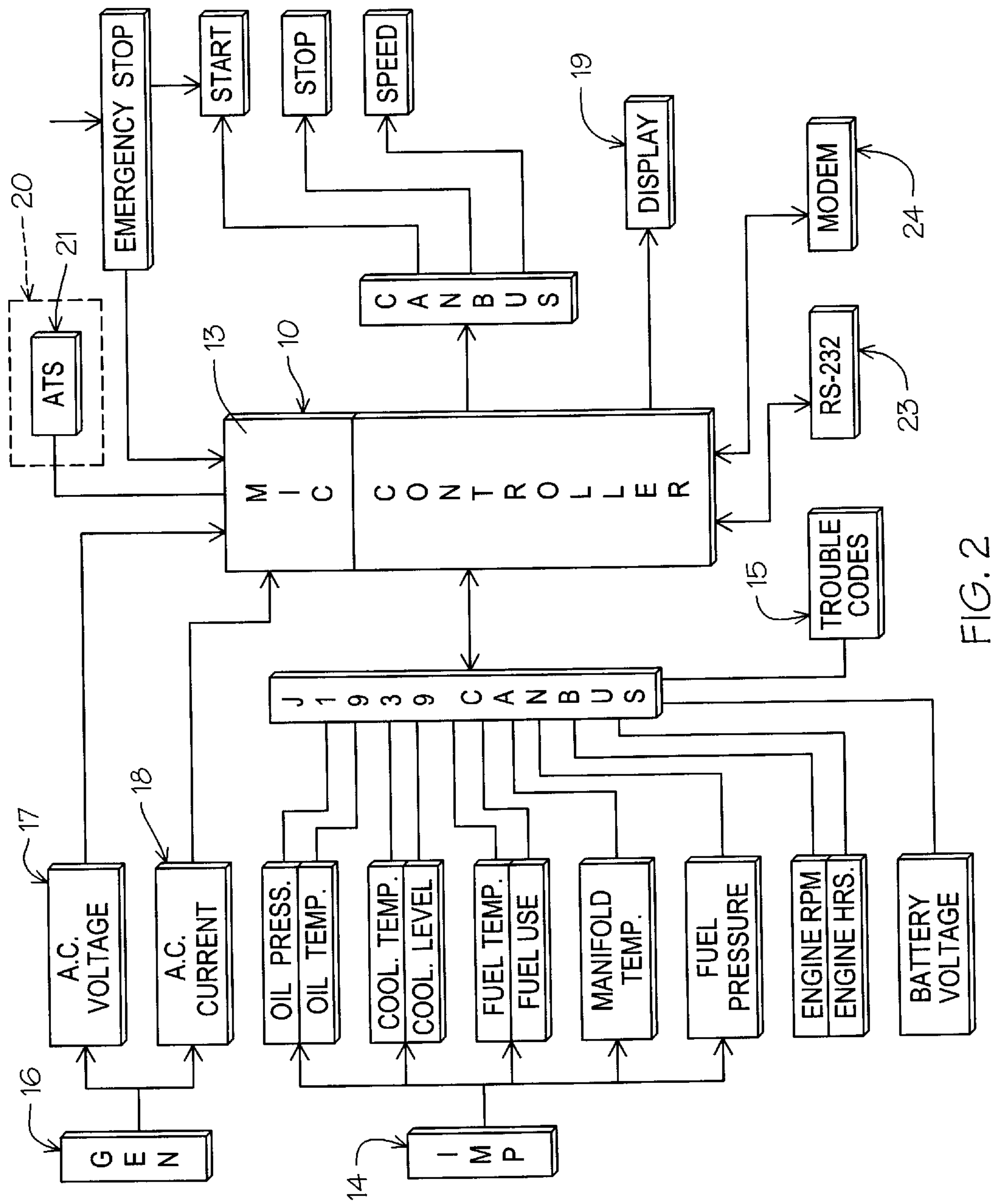
FIG. 2 is a graphic block flow diagram of a specific operational input monitor and output control actions.

Referring to FIGS. 1 and 2 of the drawings, an electronic engine controller 10 of the invention can be seen in communication with an electronic control unit (ECU) 11 associated with an engine 12. The (ECU) 11 is found on industrial engines of certain displacements to manage engine performance to meet government emission (EPA) standards. Such (ECU's) utilize a control area network (CANBUS) using a J1939 communication protocol characterized by digital addressable message protocol allowing communication between multiple (ECU's) as will be understood by those skilled in the art. Accordingly, engine manufacturers provide (ECU's) having their own proprietary control configurations and electronic codes enabled by software protocol applications. The engine controller 10 of the invention uses a microprocessor 13 and custom software application to read the control information input (IMP) generally indicated at 14 generated by the (ECU's) via the (CANBUS). The engine information inputs 14 provide critical engine performance and operation information including, but not limited to engine oil pressure, oil temperature, manifold temperature, coolant temperature, fuel pressure, fuel temperature, fuel use rates, engine RPM, engine hours, battery voltage as well as calculated percent of torque, percent of effective load to relative engine RPM and throttle position.

Other information gathered includes engine manufacturers protection operation safety parameters to indicate out of preset tolerance conditions indicated by electronic trouble codes 15.

In the example chosen for illustration, an engine 12 and a power generator 16 referred to as a (generator set) application is used in which the generator operation information is also gathered by the engine controller 10 of the invention including measuring specific performance output criteria of the generator such as AC voltage 17 and AC current 18 and calculating related power factors there from. The engine controller 10 establishes communication with (ECU) and will request status information continuously as specific data rates such as total engine hours, for example.

A display 19 is provided to communicate the engine's operational statistics so gathered and calculated given the continuous information request as noted.

The display 19 therefore will be updated with the most current information providing a real time informational access portal.

By utilization of custom software the engine controller 10 of the invention will issue commands to the (ECU) 11 to control critical operational functions such as and not limited to engine operational speed by increasing or decreasing engine speed and engine start and stop commands. As noted, in a generator application (Gen Set) the engine controller will provide via the (CANBUS) protocol programmable generator protection controls related to voltage parameters such as over voltage, and under voltage; over current, and over frequency and under frequency.

The engine controller 10 combines i.e. integrated the hereinbefore described engine monitoring and control response obtained from the engine controller with analogous analog generator monitoring and protection systems. The (ECU) 10 can also provide automatic start 20 generator set control applicable with (CANBUS) J1939 engine 12 (ECU) 11 protocol.

The auto start 20 feature is enabled via the engine controller 10 which allows starting the (Gen Set) from a remote start command input. Typically this input is generated by an automatic transfer switch ATS 21, but can be from any switch configuration with a ground in communication with the system. This feature provides for unattended automatic starting, monitoring and protection of the (Gen Set) as hereinbefore described.

It will be evident from the above description that the engine controller 10 primary operational goal is to gather specific engine operational parameters 14 supplied by the (ECU) 11 without the requirement of remote communication to individual sensors as has been required in the past. By providing bi-directional communication utilizing the J1939 protocol on the (CANBUS) information so gathered can be acted upon using the pre-programmed set and performance parameters to optimize control protection and efficiency of the (Gen Set) system.

Remote communication portals 23 and 24 utilize an RS-232 input for data control commands along with a telecommunication modem to effect remote access to the engine controller 10 of the invention.

An emergency stop can be instituted if as pre-programmed operational parameters of the system is outside of normal operation criteria.

It will thus be seen that a new and novel electronic engine controller 10 for a (Gen Set) utilizing a control network interface for bi-directional communication between an electronic engine control unit 11 and the controller 10 utilizing the (CANBUS) J1939 protocol has been illustrated and described and it will be apparent to those skilled in the art that various changes and modifications may be made thereto without departing from the spirit of the invention.

Therefore I claim:

1. An electronic control for internal combustion engines comprising:

a microprocessor based monitoring and control apparatus in bi-directional communication with an engine electronic control unit, a control area network established by said electronic control unit, said engine control interfacing with said control area networks by means of a high speed J1939 communication protocol, accessing and collecting engine performance information from said engine control unit, means for comparing said engine performance information with a set of engine performance criteria, means for controlling said engine control units in response to said means for comparison of the engine performance information, display means for said engine performance information, means for updating said display means with said engine performance information, multiple control outputs and input means, and means for automatic engine start.

2. The microprocessor based monitoring and control apparatus set forth in claim 1 wherein said means for comparing said engine performance information comprises programmable software.

3. The microprocessor based monitoring control apparatus set forth in claim 1 wherein said means for controlling said engine control units in response to said means for comparing the engine performance information with said set of engine performance criteria comprises issuing software commands to said engine control units via said control area network J1939 communication protocol.

4. The microprocessor based monitoring and control apparatus set forth in claim 1 wherein said display means comprises an alphanumeric display screen in communication with said engine control apparatus.

5. The microprocessor based monitoring and control apparatus set forth in claim 1 wherein said means for updating said display means comprises continuous information request from said electronic control units.

6. The microprocessor based monitoring and control apparatus set forth in claim 1 wherein said means for automatic engine start comprises a remote start input switch interconnected to said engine controller by select input means.

7. The microprocessor based monitoring and control apparatus set forth in claim 1 wherein said accessing engine performance information from said engine control units comprises utilizing manufacturers proprietary control and information codes to retrieve, integrate said proprietary information.

8. A method for monitoring a Gen Set utilizing control area network comprising the steps of:

a. establishing bi-directional communication between an engine controller and an electronic engine control unit on an engine, b. utilizing a control area network through J1939 communication protocol as a control interface, c. collecting and displaying engine performance information from said electronic engine control unit, d. comparing of engine performance information in view of pre-determined set of performance data criteria, e. sending software commands to said electronic engine control unit through said control area network, f. updating performance information from the engine on a continuous basis independently of engine activation, g. collecting performance information from a generator in communication with the engine, h. analytically comparing engine performance information in view of generator performance information and determining an appropriate control action in view of pre-determined engine performance thresholds.

* * * * *